United States Patent [19]

Mutou et al.

[11] 3,911,484

[45] Oct. 7, 1975

[54] OPERATION CONTROL DEVICE FOR MULTICHANNEL MEMORY APPARATUS

[75] Inventors: Katsuhisa Mutou; Tsunehiko Teshima, both of Katsuta, Japan

[73] Assignee: Hitachi, Ltd., Japan

[22] Filed: Dec. 6, 1973

[21] Appl. No.: 422,338

[30] Foreign Application Priority Data

Dec. 8, 1972 Japan .............................. 47-122534

[52] U.S. Cl. ....................... 360/35; 360/97; 360/61; 360/33; 360/63

[51] Int. Cl.[2] ..................... G11B 15/12; H04H 5/78

[58] Field of Search ............ 360/35, 63, 10, 61, 33, 360/97, 23, 12, 100; 178/6.6 DD, 6.6 HS, 6.6 FS

[56] References Cited

UNITED STATES PATENTS

| | | | |
|---|---|---|---|
| 2,680,239 | 6/1954 | Daniels | 360/100 |
| 2,874,214 | 2/1959 | Anderson | 360/35 |
| 2,877,451 | 3/1959 | Williams | 360/63 |
| 3,014,202 | 12/1961 | Hanewinkel | 360/63 |
| 3,209,339 | 9/1965 | Blaustein | 360/63 |
| 3,290,438 | 12/1966 | Okamura | 178/6.6 HS |
| 3,352,968 | 11/1967 | Walter | 360/35 |
| 3,412,215 | 11/1968 | Rawley | 360/12 |
| 3,592,476 | 7/1971 | MacDonald | 360/106 |

*Primary Examiner*—Bernard Konick
*Assistant Examiner*—Alan Faber
*Attorney, Agent, or Firm*—Craig & Antonelli

[57] ABSTRACT

An operation control device is disclosed which is used with a multichannel memory apparatus for recording video signals in and reproducing them from a multichannel-track rotary disc. A multiplicity of heads corresponding to an equal number of channel tracks, each head contactable with each track, are arranged in such a manner that when an AUTO-MANUAL change-over switch is closed on the AUTO side, the heads automatically operate in sequence, whereas the switching of the change-over switch to the MANUAL side causes a head on a track corresponding to a selected one of a plurality of separately provided push buttons to be actuated in response to the press of the button.

8 Claims, 7 Drawing Figures

OPERATION CONTROL DEVICE FOR MULTICHANNEL MEMORY APPARATUS

BACKGROUND OF THE INVENTION

1. Field of the Invention

This invention relates to an operation control device used with a multichannel memory apparatus for recording video signals in and reproducing them from a multichannel-track rotary disc.

2. Description of the Prior Art

There is a memory apparatus in which a head is fixedly arranged for a track of a rotary disc for recording video signals in and reproducing them from the rotary disc. Such a memory apparatus is limited in applications, as it is impossible to record or reproduce video signals representing more than one picture.

Another type of memory apparatus in which a head is moved to be brought into contact with a multiplicity of channel tracks in sequence has the disadvantage that in spite of the fact that as many pictures as the channel tracks can be recorded or any one of the recorded pictures can be reproduced, the mechanical switching system requires much time for transfer from one track to another. Further, because the order in which track-to-track transfer is made is fixed and the transfer must be made through an intermediate track(s), transfer to a far channel, say, from channel 1 to channel 15, is very troublesome. Also, the head movement for the transfer operation tends to cause shifted tracking.

SUMMARY OF THE INVENTION

Accordingly, it is an object of the invention to provide an operation control device for a multichannel memory apparatus whereby selection of a channel from among a multiplicity of channels on a rotary disc is effected by electrical means either automatically or manually as desired.

Another object of the invention is to provide an operation control device for a multichannel memory apparatus which is provided with a comparatively compact automatic or manual channel switching system for selection of channels on a rotary disc.

Still another object of the invention is to provide an operation control device for a multichannel memory apparatus whereby the automatic channel switching operation can be performed at any desired speed.

DESCRIPTION OF THE PREFERRED EMBODIMENTS

Figure 1:
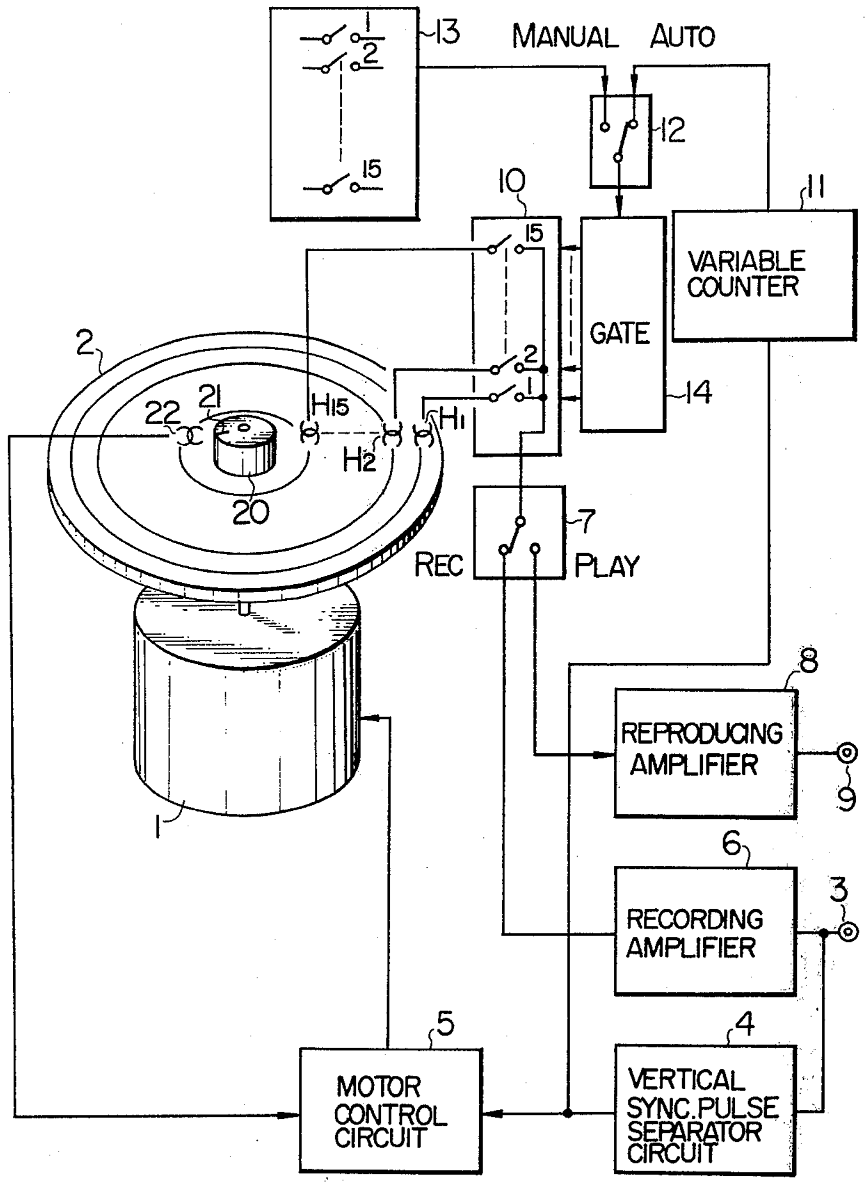
FIG. 1 is a schematic diagram showing the operation control device for the multichannel memory apparatus according to the invention.

Referring to FIG. 1, a rotary disc 2 is fixed on the motor shaft of the synchronous motor 1, which rotary disc 2 has a multiplicity of channel tracks where heads $H_1$, $H_2$, . . . $H_{15}$ are respectively fixedly arranged. Out of the video signal inputs to the video signal input terminal 3, only vertical synchronizing pulses are picked up by the vertical synchronizing pulse separator circuit 4 and applied to the motor control circuit 5, the output of which is used to drive the synchronous motor 1 thereby to rotate the rotary disc 2. Reference numeral 21 shows a magnet recessed into a groove formed in the cylinder member 20 fixed on the top of the motor shaft of the synchronous motor 21, which magnet, on each of its rotations, passes the position detection head 22 opposed thereto thereby to produce rotational pulses from the head 22. These rotational pulses are applied to the motor control circuit 5 for controlling the motor-driving frequencies. Under normal conditions, the rotary disc 2 rotates in synchronism with the frequency of 60 Hertz.

The video signal applied to the video signal input terminal 3 is applied through the recording circuit 6 to an input terminal on the recording side of the recording-reproduction change-over circuit 7, the reproduction output of which is connected through the reproducing circuit 8 to the output terminal 9. A common terminal or movable terminal of the circuit 7 is connected to the head transfer circuit 10 which has a plurality of electrical transmission paths corresponding to the plurality of channel heads $H_1$, $H_2$, . . . , $H_{15}$, respectively. The plurality of electrical transmission paths include electrical switches as shown in the figure. Under normal conditions where these switches are open, the recording amplifier 6 or reproducing amplifier 8, as the case may be, is electrically disconnected from the heads $H_1$, $H_2$, . . . $H_{15}$.

This invention is intended to control the conduction of the plurality of electrical transmission paths at will, and for this purpose the pulses associated with the synchronizing pulses produced from the vertical synchronizing pulse separating circuit 4 are applied as required to the AUTO terminal of the AUTO-MANUAL change-over switch 12 through the variable counter 11. The MANUAL terminal of the switch 12 is cnnected to the manual switch 13 comprising switch elements 1, 2, . . . 15 corresponding to the heads 1, 2, . . . 15 respectively, while a common or movable terminal of the switch 12 is connected to the gate circuit 14 which in turn is connected to the head transfer circuit 10.

In this arrangement, when the AUTO-MANUAL change-over switch 12 is closed on the AUTO side, the pulses associated with the vertical synchronizing pulses are applied to the gate circuit 14 whereby the switches of the head transfer circuit 10 are energized in succession from channel 1, while at the same time cutting off the switch corresponding to the immediately preceding channel, so that the electrical connection between the recording or reproducing amplifier 6 or 8 and the heads is continuously switched. Thus channel 1 is energized subsequent to channel 15.

In the state where the AUTO-MANUAL change-over switch 12 is closed on the MANUAL side, the operation of a manual switch element of the switch 13 corresponding to a desired head causes a switch corresponding to the desired head in the head transfer circuit 10 is closed, whereupon only the electrical connection for that particular head is accomplished.

Figure 2A:
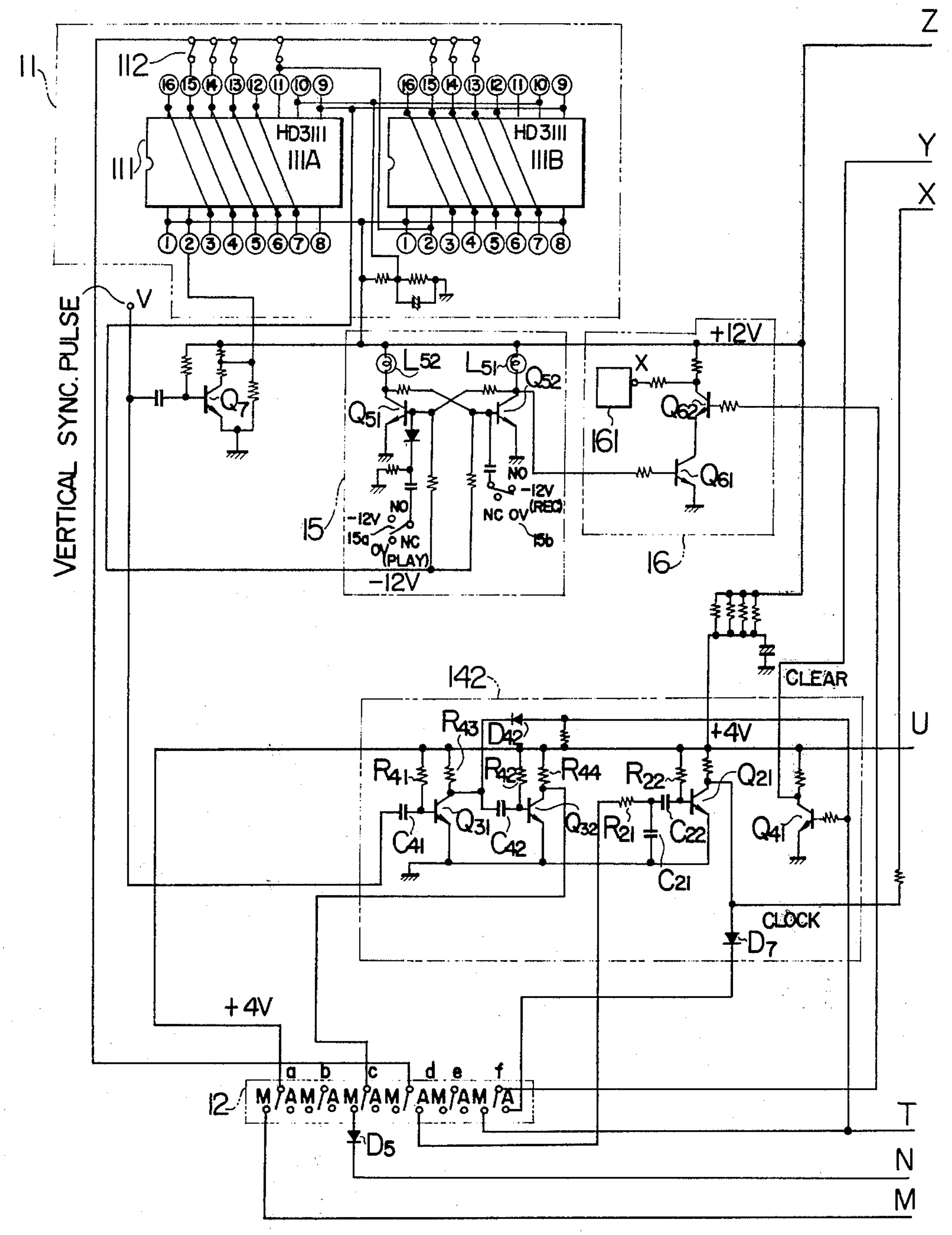
FIGS. 2*a* and 2*b* contains a circuit diagram showing an embodiment of the essential parts of the device shown in FIG. 1.
Figure 2B:
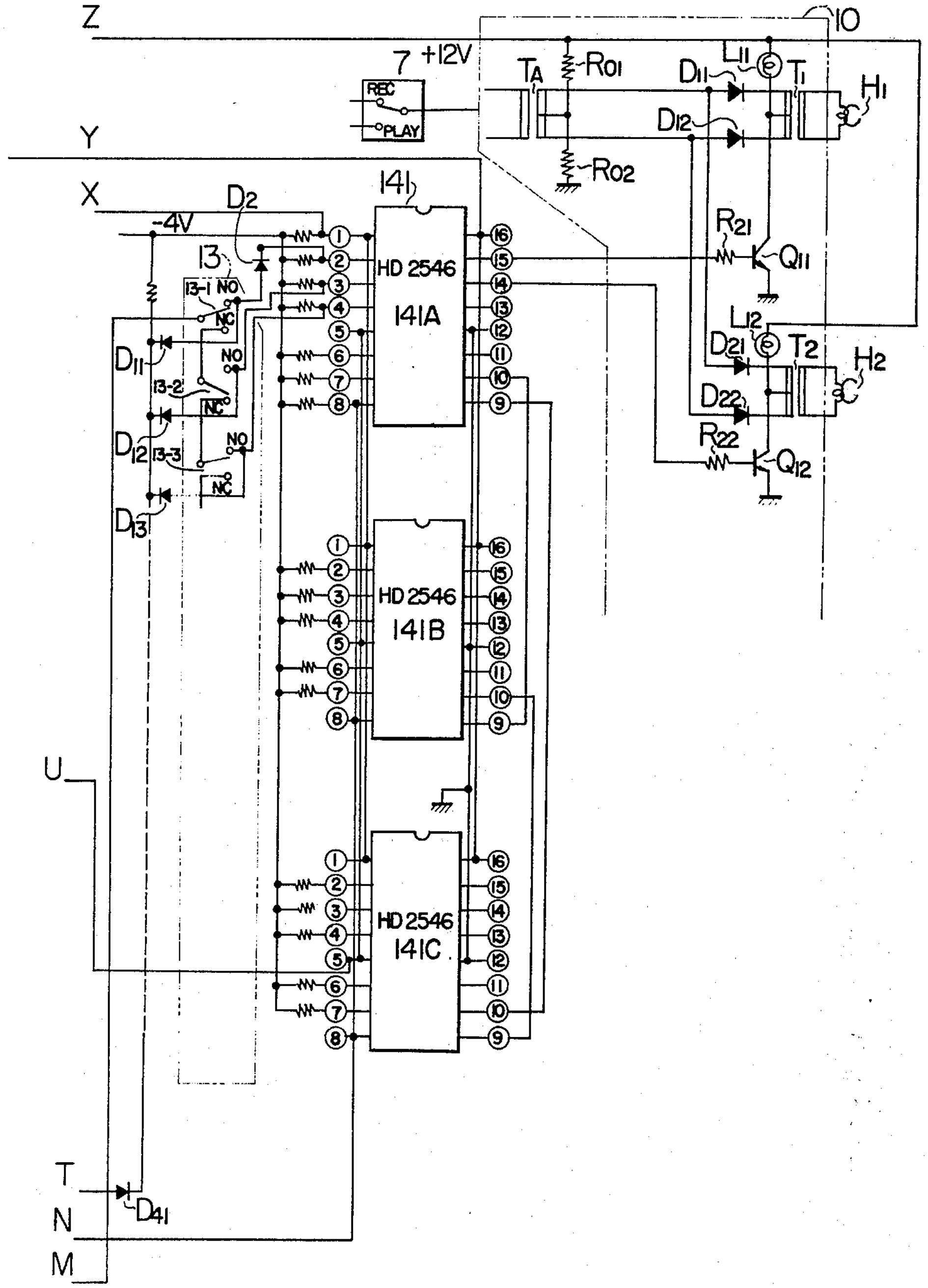

Such an operation will be explained with reference to FIGS. 2*a* and 2*b* showing a circuit diagram of an embodiment. It will be understood that lines M, N, T, U, X, Y and Z in FIG. 2*a* are connected to the corresponding lines in FIG. 2*b*.

Reference numeral 10 shows a head transfer circuit having a plurality of electrical transmission paths corresponding to the plurality of channel heads $H_1$, $H_2$, . . . , $H_{15}$. The head transfer circuit including a pulse transformer $T_A$ the primary winding of which is connected to the recording-reproduction change-over circuit 7. The middle point of the secondary winding of the pulse transformer $T_A$ is supplied with a voltage divided by the resistors $R_{01}$ and $R_{02}$. This pulse transformer is associated with the heads $H_1$, $H_2$,... $H_{15}$ of which only the heads $H_1$ and $H_2$ are shown as their connection to the pulse transformer is similar. The electrical transmission path to the head $H_1$ includes diodes $D_{11}$, $D_{12}$, pulse transformer $T_1$ and transistor $Q_{11}$, the anodes of the diodes $D_{11}$ and $D_{12}$ are connected to the ends of the secondary winding of the pulse transformer $T_A$, the cathodes thereof are connected to the ends of the primary winding of the pulse transformer $T_1$, and the ends of the secondary winding of the pulse transformer $T_1$ is connected to the head $H_1$. The middle point of the primary winding of the pulse transformer $T_1$ is connected to a power line through the lamp $L_{11}$ on one hand and grounded through the collector and emitter of the transistor $Q_{11}$ on the other, the base thereof being connected with the resistor $R_{21}$.

In this circuit arrangement, the diodes $D_{11}$ and $D_{12}$ are cut off and therefore the recording amplifier or reproduction amplifier through the recording-reproduction change-over circuit 7 is electrically disconnected from the head $H_1$ in the absence of a gate input to the transistor $Q_{11}$. The other heads $H_2$, . . . $H_{15}$ are also disconnected. With the application of a gate input to any of the transistors $Q_{11}$, $Q_{12}$ and so on, the diode of a corresponding channel is energized thereby to provide a conductive electrical transmission path corresponding to the head $H_1$ or $H_2$.

Figure 3:
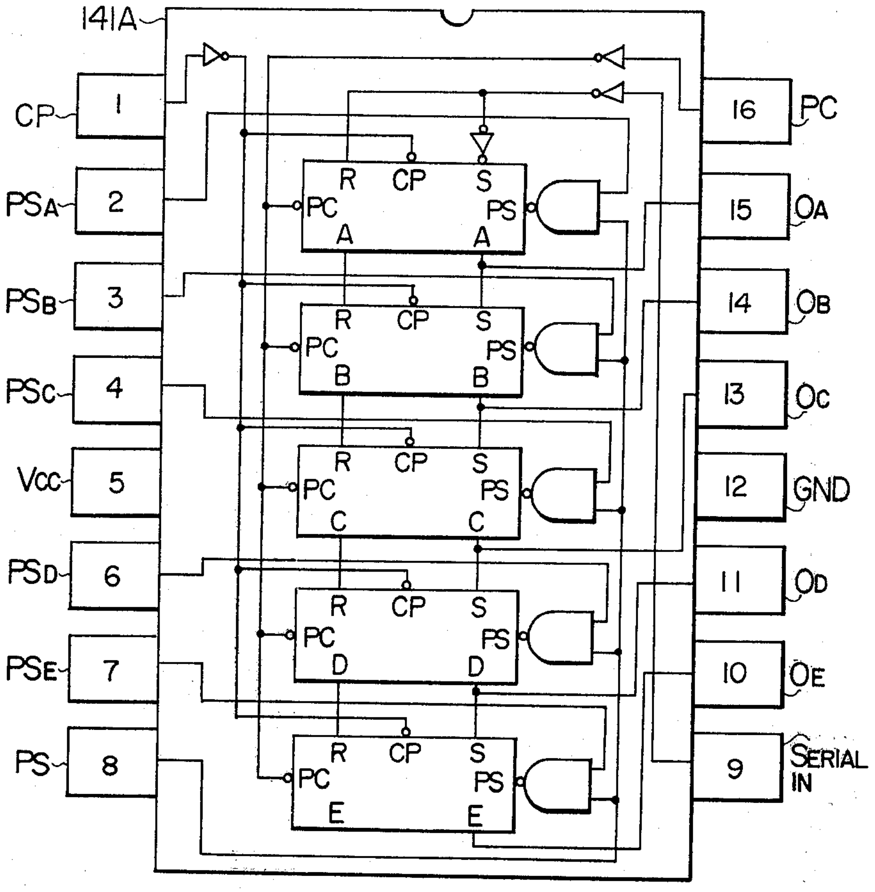
FIG. 3 is a circuit diagram showing a shift register making up the head transfer drive circuit included in the circuit of FIGS. 2*a* and 2*b*.

An AUTO-MANUAL change-over switch 12 comprising six switch elements 12*a* to 12*f* is shown at the lower left part of FIG. 2*a*. A manual switch 13 is shown in FIG. 2*b* and comprises switch elements 13-1, 13-2 and so on corresponding to the heads $H_1$, $H_2$, . . . $H_{15}$ respectively. To the immediate right of the manual switch 13 is shown a head transfer drive means 141 making up part of the gate circuit 14, which includes three shift registers 141A to 141C consisting of, say, integrated circuits IC:HD2546 made by Hitachi, Ltd. Each of these integrated circuits make up a 5-bit shift register of a circuit arrangement shown in FIG. 3 and has a total of 16 terminals including eight terminals respectively on input and output sides thereof. Of these output terminals, an output signal is produced actually from the five terminals 15, 14, 13, 11 and 10, so that the application of a clock pulse to the terminal 1 causes an output to be first produced from the terminal 15, the application of the next clock pulse resulting in an output being produced only from the terminal 14. In similar fashion, outputs are produced from the terminals 13, 11 and 10 in that order subsequently. In view of the fact that the terminal 10 is connected to the terminal 9 of the following integrated circuit 141, the arrival of a clock pulse causes an output to be produced from the integrated circuit 141B following the production of an output from the integrated circuit 141A. In like manner, outputs are produced from the terminals 15, 14, 13, 11 and 10 of the integrated circuit 141C in that order. Since the terminal 10 of the integrated circuit 141C is connected to the terminal 10 of the first integrated circuit 141A, the arriving clock pulse returns to the integrated circuit 141A. Thus with the arrival of a clock pulse, an output is first produced at the terminal 15 and applied as a gate input to the transistor $Q_{11}$ to energize the same, so that the diodes $D_{11}$ and $D_{12}$ are energized thereby to accomplish the electrical path for head $H_1$ while at the same time lighting the lamp $L_{11}$. The arrival of the next clock pulse causes the electrical connection for head $H_2$ to be established, and the lamp $L_{12}$ is turned on. At this time, the electrical path for the head $H_1$ is cut off and the lamp $L_{11}$ turned off.

Referring to the clock pulses, they are generated when the AUTO-MANUAL change-over switch 12 is closed on the AUTO side. At that time, a negative pulse associated with the vertical synchronizing signal is applied to the transistor $Q_{21}$ by way of the switch 12*d* and an integrating circuit comprising the capacitor $C_{21}$ and resistor $R_{21}$ of the waveform shaping circuit 142. Because the transistor $Q_{21}$ is in an energized state with a voltage applied through the resistor $R_{22}$ to the base thereof, the transistor $Q_{21}$ is de-energized and a positive pulse appears at the collector thereof at the time of application of the negative portion of a integrated waveform to the transistor $Q_{21}$. The pulse thus produced is applied as a clock pulse to the clock pulse terminal 1 of the integrated circuit 141A of the head transfer drive means 141, so that at each time of arrival of a clock pulse, the electrical connection for heads $H_1$, $H_2$, . . . $H_{15}$ is established in sequence, with the result that video signals are recorded successively on the channel tracks of the rotary disc 2 shown in FIG. 1 for recording operation or video signals are picked up successively from the channel tracks of the rotary disc 2 and applied to the reproducing amplifier for reproducing operation, as the case may be. In both cases, the process is indicated by lamps $L_{11}$, $L_{12}$ and so on. The reproducing operation is also monitored on the television screen.

The description made above was about the automatic switching of electrical connection to the heads which was performed with the AUTO-MANUAL change-over switch 12 closed on the AUTO side.

The operation of the device according to the invention will be now explained, by contrast, by reference to the case in which the AUTO-MANUAL change-over switch is closed on the MANUAL side. Upon application of a clear pulse to the terminal 16, all of the integrated circuits 141A to 141C of the head transfer drive means 141 are de-energized even when an output is produced from any of the channel output terminals 15, 14, 13, 11 and 10. An output is produced from the terminal 15 when a preset input is applied to the terminal 8 and a pulse input to a desired channel input terminal, say, terminal 2, whereas with the application of inputs to the terminals 8 and 3 an output is produced from the terminal 14.

The manual switch 13 comprises 15 two-circuit one-contact switch elements which are equal in number to the heads $H_1$, $H_2$, . . . $H_{15}$. Because the operation concerning each of the switch elements is similar, the operation of only the switch element 13-1 will be explained.

A voltage of +4 volts is applied to the common (movable) terminal of the switch element 13-1 through the switch element 12*a* of the AUTO-MANUAL change-over switch 12. The switch element 13-1 which is normally closed on the NC(Normal close) side is transferred to the NO (Normal open) side at the press of the button for channel 1 and then the diode $D_2$ is energized to apply an input to the channel input terminal 2. The input pulses shown in A of FIG. 4 continued to be applied to the terminal 2 as long as the button is depressed. Under this condition, the voltage of +4 volts applied to the switch element 13-1 is supplied to the cathode of the diode $D_{41}$ through the diode $D_{11}$. The anode of the diode $D_{41}$ is connected to the anode of the diode $D_{42}$ the cathode potential of which is compared with the anode potential of the diode $D_{41}$, the cathode of the diode $D_{42}$ being connected to the collector of the transistor $Q_{31}$. Synchronizing pulses or negative pulses shown in B of FIG. 4 in the present case are applied to the transistor $Q_{31}$ and differentiated by the differentiation circuit comprising the capacitor $C_{41}$ and resistor $R_{41}$ (C of FIG. 4). The transistor $Q_{31}$ which was energized with a voltage applied to the base thereof through the resistor $R_{41}$ is de-energized upon application thereto the differentiated negative waveform, with the result that the collector potential of the transistor $Q_{31}$ is raised. In other words, positive pulses shown in D of FIG. 4 in synchronism with the negative waveform are taken out, so that the voltage of +4 volts is applied to the cathode of the diode $D_{42}$ only in the presence of the positive pulses. As a result, the collector potential becomes equal to the cathode potential of the diode $D_{41}$, and only under this condition the transistor $Q_{41}$ connected to the anodes of the diodes $D_{41}$ and $D_{42}$ is energized thereby to reduce the collector potential to zero as illustrated in E of FIG. 4. The resulting clear pulses are applied to the clear terminals 16 of the integrated circuits 141A to 141C of the head transfer drive means 141, whereupon all of the outputs 15, 14, . . . and so on are terminated.

Figure 4:
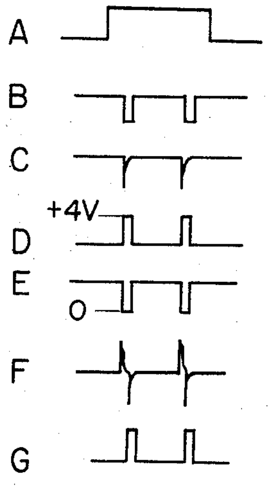
FIG. 4 shows waveforms for explaining the operation of the device according to the invention.

As to the preset pulse applied to the preset input terminal 8, output pulses shown in D of FIG. 4 produced from the transistor $Q_{31}$ are differentiated by the differentiation circuit comprising the capacitor $C_{42}$ and the resistor $R_{42}$ (F of FIG. 4), so that the differentiated pulses are applied to the transistor $Q_{32}$ which, like the transistor $Q_{31}$, produces at its collector pulses (G of FIG. 4) in synchronism with the differentiated negative waveform. The pulses thus produced from the collector of the transistor $Q_{32}$ are applied to the preset pulse input terminal 8 of each of the integrated circuits 141A to 141C through the switch 12*c* and diode $D_5$ as preset pulses. With the application of pulses to the terminals 8 and 2, an output is produced from the channel output terminal 15 whereby the electrical connection to the head $H_1$ for channel 1 is established. In view of the fact that the preset pulses are generated subsequent to the clear pulses, as are apparent from D and G of FIG. 4, head transfer operation is performed after the clearing operation. The width of the clear pulses and preset pulses is smaller than the vertical synchronizing pulse because of the time cnstant due to the resistor and capacitor included in the differentiation circuit, and therefore their adverse effect, if any, on the screen image quality is almost negligible.

In this way, the automatic and manual transfer of the multihead system is selected at will, thus offering convenient means tailored to operator needs.

In FIG. 2*a* is shown a variable counter 11 comprising a frequency divider circuit 111 and a multiple frequency divider switch 112. The frequency divider circuit 111 includes, in the shown case, circuit elements 111A and 111B consisting of IC:HD-3111 made by Hitachi, Ltd. This frequency divider circuit 11 receives as an input thereto pulses resulting from the phase-shifting through transistor $Q_7$ of the positive synchronizing pulses input to the terminal V. The vertical synchronizing pulses which is 60 Hertz in frequency and are repetitive pulses generated at regular intervals of 1/60 sec. are divided and produced at output terminals 11, 13 to 15, and 13 to 15 at different interval pulses consist of 0.1, 0.2, 0.3, 1, 4.3, 8.6 and 17 seconds respectively. The repetition rate of these interval pulses is lower than that of the vertical synchronizing pulses. One of these interval pulses is picked up by the multiple frequency divider switch 112 the output from which is applied to the waveform shaping circuit 142 as pulses associated with the vertical synchronizing pulses.

In the case of automatic transfer, therefore, the speed with which the switching from one channel to another is effected can be changed at will by frequency selection through the multiple frequency divider switch 112.

Figure 5:
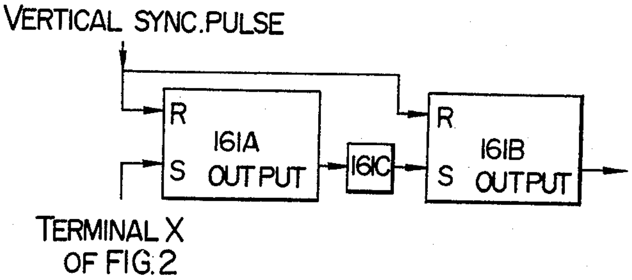
FIG. 5 is a block diagram showing part of a recording pulse-generating circuit included in the device according to the invention.
Figure 6:
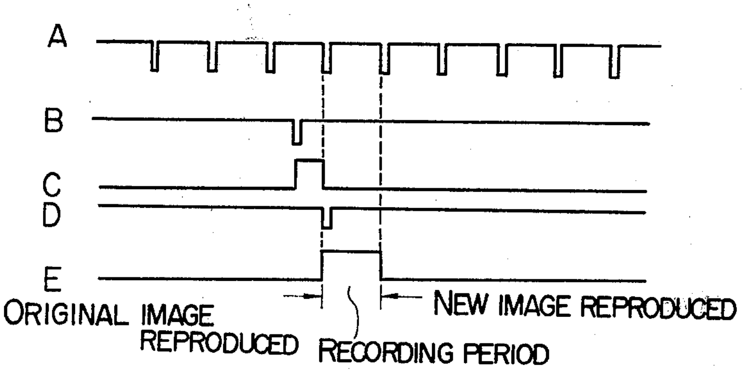
FIG. 6 shows waveforms for explaining the operation of the device according to the invention.

Also in FIG. 2*a* is shown a hold circuit 15 comprising a bistable multivibrator for holding a recording or reproduction state. The depressing of the reproduction button and thereby the closing of the reproduction switch 15*a* to the NO (normal open) side causes the base potential of the transistor $Q_{51}$ to be reduced thereby to cut off the transistor $Q_{51}$, while energizing transistor $Q_{52}$, thus lighting the load lamp $L_{51}$. By depressing the recording button to close the recording switch 15*b* to the NO side, on the other hand, the transistor $Q_{52}$ is de-energized while the transistor $Q_{51}$ is energized thereby to light the lamp $L_{52}$. In this manner, the recording or reproduction state is identified by the ON-OFF operation of the lamps $L_{51}$ and $L_{52}$. The transistor $Q_{52}$ the collector of which is connected to the base of the transistor $Q_{61}$ of the recording pulse generator circuit 16 causes the transistor $Q_{61}$ to be energized only at the time of recording when the collector potential of the transistor $Q_{52}$ is raised. The base of the transistor $Q_{62}$ shown above the transistor $Q_{61}$ in the drawing is connected to the collector of the transistor $Q_{21}$ and thus the clock pulses are applied to the transistor $Q_{62}$ and then to the pulse generator 161 through the collector terminal *x*, only when the switch 12*f* is closed on the AUTO side. The pulse generator circuit 161, as shown in FIG. 5, comprises two bistable multivibrators 161A and 161B and the differentiation circuit 161C. With reference to FIG. 6 presented for explaining the operation of the device according to the invention, the synchronizing pulses shown in A of FIG. 6 are applied to the reset terminal R of the bistable multivibrator 161A whereby the output of the multivibrator 161A is reduced to 0. With the arrival of the input pulse shown in B of FIG. 6, it is reversed from zero to 1 state (C of FIG. 6). This 1 pulse, however, is changed to a 0 pulse again by the next synchronizing pulse which is applied to the reset terminal R. The resulting output is differentiated by the differentiation circuit 161C and the negative pulse (D of FIG. 6) produced from the differentiation circuit 161C is applied to the set terminal S of the bistable multivibrator 161B in the next stage thereby to convert the output of the multivibrator 161B from the 0 to 1 state. in other words, the output of the multivibrator 161B is changed from 0 to 1 state by a given vertical synchronizing pulse and then reconverted into a 0 pulse by the next-arriving vertical synchronizing pulse. Thus the output of the multivibrator 161B is maintained in 1 state only for the period of one field that is 1/60 second, which functions as a switch to limit the recording operation to one field in spite of the recording lamp being kept turned on longer by depressing the recording button. As can be seen from the above description, the rotary disc according to the invention is such that only a field of recording operation is performed for each round of a channel, so that the switching is made to the reproduction immediately after the recording operation, thus preventing the video signal recorded in the channel from being erased.

It will be understood from the above explanation that according to the present invention the multihead transfer operation can be effected automatically or manually as desired. Further, video signals recorded automatically can be reproduced manually, or vice versa, by the operation of the AUTO-MANUAL change-over switch, thus widening the field of application of the control device. Furthermore, as shown in FIGS. 2*a* and 2*b*, the comparatively simple configuration makes a compact control system possible. What is more, any desired speed of head transfer for automatic recording operation is conveniently selected at will.

We claim:

1. An operation control device for a multichannel memory apparatus comprising:

vertical synchronizing pulse separater means for separating vertical synchronizing pulses from a video signal;

counter means connected to the vertical synchronizing pulse separater means for generating specified pulses whose repetition rate is lower than that of the vertical synchronizing pulses;

a rotatable magnetic member having a plurality of magnetic recording channel tracks;

a plurality of channel heads each assigned to a respective one of the plurality of channel tracks of said rotatable magnetic member;

a recording-reproducing change-over switch having a movable contact and two stationary contacts, one of the stationary contacts being connected to a recording stage and the other of the stationary contacts being connected to a reproducing stage;

head transfer means having a plurality of electrical transmission paths connected between a respective one of said channel heads and the movable contact of the recording-reproducing change-over switch, for controlling the conduction of the plurality of the electrical transmission paths one after another; and auto-manual change-over switching means including an auto-operation switch means and a manual-operation switch means which are alternatively rendered operable, said auto-operation switch means, when rendered operable, transmitting therethrough pulses in accordance the specified pulses from the counter means to the head transfer means so that the conduction of the plurality of the electrical transmission paths is controlled in sequence by the pulses, and said manual-operation switch means having a plurality of manually conducting unit switch means each assigned to a respective one of the electrical transmission paths so that when one of the unit switch means is rendered operable while the manual-operation switch means is operable, the corresponding electrical transmission path is rendered conductive.

2. An operation control device as defined in claim 1, wherein said counter means includes:

frequency divider means connected to said vertical synchronizing pulse separater means for producing a plurality of pulse trains whose repetition rates are different and lower than that of the vertical synchronizing pulses by dividing the repetition rate of the vertical synchronizing pulses at different dividing rates; and select switch means connected to said frequency divider means for selecting one of said plurality of pulse trains.

3. An operation control device as defined in claim 1, wherein said head transfer means includes:

a common pulse transformer having primary and second windings, said primary winding being selectively connected to one of a recording amplifier and a reproducing amplifier, said secondary winding being supplied with a predetermined voltage at the middle point thereof;

a plurality of pulse transformers each corresponding to a respective one of said plurality of channel heads, the secondary windings of said plurality of pulse transformers being connected to said plurality of channel heads, respectively;

a plurality of diodes connected between the ends of the secondary winding of said common pulse transformer and the ends of the primary windings of said plurality of pulse transformers;

a plurality of lamps each connected between the center point of the primary winding of an associated one of said plurality of pulse transformers and a power line;

a plurality of transistors each connected between the center point of the primary winding of associated one of said plurality of pulse transformers and ground; and means for supplying the pulses associated with the specified pulses to said plurality of transistors one after another in sequential relation so as to cause sequential conduction of said plurality of transistors.

4. An operation control device as defined in claim 1, wherein said head transfer means includes a plurality of integrated circuits.

5. An operation control device as defined in claim 1, wherein said auto-operation switch means includes pulse generator circuit means for generating pulses associated with the specified pulses to said head transfer means, said pulse generating circuit means including an integrating circuit means for integrating pulses associated with the vertical synchronizing pulses of the video signal and transistor circuit means for producing positive clock pulses in response to the negative part of the waveform integrated by said integrating circuit means for application to said head transfer means.

6. An operation control device as defined in claim 1, wherein said manual-operation switch means includes pulse generator circuit means for producing a clear pulse from a pulse associated with the vertical synchronizing pulse of the video signal and for producing a present pulse which lags behind the clear pulse by the width of the clear pulse.

7. An operation control device according to claim 6, wherein said pulse generator circuit means includes first differentiating circuit means for differentiating a pulse associated with the vertical synchronizing pulse of the video signal, first transistor circuit means for taking out positive pulses responding to the negative part of the waveform differentiated by said first differentiated by said first differentiating circuit means, circuit means for providing clear pulses in accordance with the positive pulses, second differentiating circuit means for differentiating the positive pulses and a second transistor circuit for taking out positive preset pulses corresponding to the negative part of the waveform differentiated by said second differentiating circuit means.

8. An operation control device as defined in claim 7, wherein said circuit means for providing clear pulses includes transistor circuit means which is energized to provide clear pulses only when the positive pulses are taken out by said first transistor circuit means.

* * * * *